United States Patent [19]

Boffardi

[11] Patent Number: 4,693,829
[45] Date of Patent: Sep. 15, 1987

[54] USE OF CARBOXYLIC ACID/SULFONIC ACID COPOLYMERS AS ALUMINUM ION STABILIZERS

[75] Inventor: Bennett P. Boffardi, Bethel Park, Pa.

[73] Assignee: Calgon Corporation, Pittsburgh, Pa.

[21] Appl. No.: 847,995

[22] Filed: Apr. 3, 1986

[51] Int. Cl.$^4$ .................................................. C02F 5/12
[52] U.S. Cl. .................................... 210/697; 210/701; 252/180; 252/181; 422/16
[58] Field of Search ................................ 210/698–701, 210/697; 252/180, 181; 422/16, 17

[56] References Cited

U.S. PATENT DOCUMENTS 3,709,816  1/1973  Walker et al. ...................... 210/701
3,806,367  4/1974  Lange et al. ....................... 210/701
3,928,196  12/1975  Persinski et al. .................. 210/701

Primary Examiner—Peter Hruskoci
Attorney, Agent, or Firm—W. C. Mitchell; M. C. Sudol, Jr.; R. B. Olson

[57] ABSTRACT

The present invention is directed to a method to stabilize aluminum ions in recirculating water systems comprising adding to the system 0.1 to 1,000 ppm of a water-soluble polymer having an intrinsic viscosity of 0.05 to 2.5 dl/g in 1.0 M NaCl, prepared from:

(A) 35 to 90%, by weight, of an unsaturated carboxylic compound selected from the group consisting of acrylic acid, methacrylic acid, their salts and mixtures thereof; and (B) 10 to 65%, by weight, of an unsaturated sulfonic compound selected from the group consisting of 2-acrylamido-2-methylpropylsulfonic acid, 2-methacrylamido-2-methylpropylsulfonic acid, their salts and mixtures thereof.

2 Claims, No Drawings

USE OF CARBOXYLIC ACID/SULFONIC ACID COPOLYMERS AS ALUMINUM ION STABILIZERS

BACKGROUND OF THE INVENTION

Aluminum ions are essentially insoluble in the pH range of approximately 4.5 to 10.0. Within this pH range, aluminum will deposit on heat transfer surfaces causing underdeposit attack. The addition of the copolymers of the present invention increases the level of aluminum ions in solution, thus reducing deposit and corrosion attack.

U.S. Pat. No. 3,928,196 discloses the use of a copolymer of 2-acrylamido-2-methylpropylsulfonic acid and acrylic acid in inhibiting scale.

DESCRIPTION OF THE INVENTION

The present invention is directed to a method to stabilize aluminum ions in recirculating water systems comprising adding to the system 0.1 to 1,000 ppm of a water-soluble polymer having an intrinsic viscosity of 0.05 to 2.5 dl/g in 1.0 M NaCl, prepared from:
(A) 35 to 90%, by weight, of an unsaturated carboxylic compound selected from the group consisting of acrylic acid, methacrylic acid, their salts and mixtures thereof; and
(B) 10 to 65%, by weight, of an unsaturated sulfonic compound selected from the group consisting of 2-acrylamido-2-methylpropyl-sulfonic acid, 2-methacrylamido-2-methyl-propylsulfonic acid, their salts and mixtures thereof.

The phrase "stabilize aluminum ions" is meant to include prevention of aluminum ion deposition and corrosion of the recirculating water system equipment.

The unsaturated carboxylic compounds which may be used to prepare the polymer includes acrylic acid, methacrylic acid, their salts and mixtures thereof. The preferred compound is acrylic acid.

The unsaturated sulfonic compound which may be used to prepare the polymer includes 2-acrylamido-2-methylpropylsulfonic acid, 2-methacrylamido-2-methylpropylsulfonic acid, their salts and mixtures thereof. The preferred compound is 2-acrylamido-2-methylpropylsulfonic acid.

Mixtures of the various monomers may be used.

The polymers used in the present invention are prepared from 35 to 90%, preferably 50-70%, by weight, of an unsaturated carboxylic compound; and 10 to 65%, preferably 30 to 50%, by weight, of an unsaturated sulfonic compound.

The polymers may be prepared by mixing the monomers preferably in the presence of a free radical initiator. Any free radical initiator may be used. Examples include peroxides, azo initiators and redox systems. The polymerization may also be initiated photochemically. The preferred catalysts are sodium persulfate and sodium metabisulfite or a mixture of ammonium persulfate and any azo type initiator, such as 2,2'-azobis-(2,4-dimethyl-4-methoxyvaleronitrile).

The polymerization may be conducted by any of a variety of procedures, for example, in solution, suspension, bulk and emulsions.

The reaction temperature is not critical. The reaction will generally occur between 10 and 100° C. The reaction, depending on the temperature, generally takes from 5 minutes to 12 hours. Measuring for residual monomer will verify when the reaction is complete.

The pH of the reaction mixture is not critical. The pH is generally in the range of 3.0 to 9.0.

The percent solids in the reaction mixture is not critical. The preferred range is 1 to 50%, by weight, solids.

The polymers are usually identified by intrinsic viscosity. The intrinsic viscosity should be 0.05 to 2.5, preferably 0.05 to 0.5 dl/g, in 1.0 M sodium chloride (measured on a 75 Cannon Ubbelohde capillary viscometer).

The polymers of the instant invention are used in a range of 0.1 to 1,000 ppm, preferably 1.0 to 100 ppm, most preferably 1.0 to 25 ppm.

EXAMPLES

The following abbreviations are used in the examples and are defined as indicated: AA/AMPSA=a copolymer prepared from 60%, by weight, acrylic acid and 40%, by weight, 2-acrylamide-2-methylpropyl-sulfonic acid having an intrinsic viscosity of 0.1 dl/g.

Examples 1 Through 9

Eight liters of Pittsburgh tap water which had been concentrated four times (88 ppm $Ca^{++}$, 24 ppm $Mg^{++}$, 328 ppm $SO_4^=$, 70 ppm $Cl^-$ and 40 ppm $HCO_3^-$) was used at 50° C., over 24 hours at a pH range of 6 to 10 at 0.5 intervals. 5 ppm $Al^{+3}$ ions were added. Samples were tested with and without 50 ppm active AA/AMPSA. After 24 hours at each pH, the sample was filtered through 0.22µ millipore filter paper. The ppm of $Al^{+3}$ ions collected was substracted from the amount added to determine the soluble $Al^{+3}$ ions. The turbidity (NTU=nephelometric turbimetric units) was also measured and observed in the AA/AMPSA samples. The results are reported in Table I.

TABLE I

| Example | pH | Control Soluble $Al^{+3}$ (ppm) | AA/AMPSA treated Soluble $Al^{+3}$ (ppm) | Turbidity (NTU) | |
|---|---|---|---|---|---|
| 1 | 6.0 | 0.1 | 0.6 | 3.6 | clear |
| 2 | 6.5 | 0.1 | 0.1 | 6.0 | hazy |
| 3 | 7.0 | 0.2 | 0.3 | 6.7 | hazy |
| 4 | 7.5 | 0.4 | 0.6 | 4.4 | hazy |
| 5 | 8.0 | 0.1 | 4.1 | 3.5 | clear |
| 6 | 8.5 | 0.8 | 1.5 | 3.5 | clear |
| 7 | 9.0 | 0.1 | 1.8 | 25 | very cloudy |
| 8 | 9.5 | 0.4 | 1.8 | 150 | very cloudy |
| 9 | 10.0 | 0.1 | 1.5 | 38 | very cloudy |

Examples 10 Through 15

Barium sulfate scale deposition, in the absence of aluminum ions, can be controlled by Orlene BA, manufactured by Calgon Corporation, a composition of tripolyphosphate, sodium hexamethaphosphate, polyacrylic acid and sodium glucoheptonate. The presence of aluminum ions, however, severly interferes with this scale inhibition. The addition of AA/AMPSA was found to stabilize the aluminum ions and allow the Orlene BA to effectively inhibit barium sulfate scale deposition.

The barium sulfate inhibition was determined by adding a given concentration of Orlene BA and the AA/AMPSA copolymer to a solution containing 71 ppm $Na_2SO_4$ and 122 ppm $BaCl_2.2H_2O$ at pH 5.0. The solution was stored in a stagnant flask for 24 hours at 22°–25° C. Poor performing samples allow barium sulfate precipitation to occur. The inhibitor effectiveness under these conditions is obtained by determination of the soluble barium content of the test solution using an EDTA type titration (phthaline purple indicator). The soluble barium ion concentration in the absence of inhibitor is equivalent to 0% scale inhibition. The percent inhibition for a given test is determined by:

$$\frac{Ve - Vo}{Vt - Vo} \times 100 = \% \text{ inhibition}$$

Vo = the EDTA titration volume with no inhibitor present (control).

Vt = the EDTA titration volume with only barium present (blank).

Ve = the experimental EDTA titration volume when inhibitors are present in the test solution.

The results are summarized in Table 2.

TABLE II

| | Barium Sulfate Inhibition pH 5.0, room temperature (22-25° C.) | | | |
|---|---|---|---|---|
| Example | Orlene BA (ppm product) | AA/AMPSA (ppm active) | $Al_{+3}$ (ppm) | % inhibition 24 hrs. |
| 10 | 10 | 0 | 0 | 100 |
| 11 | 10 | 0 | 0.5 | 0 |
| 12 | 10 | 5 | 0.5 | 18 |
| 13 | 10 | 10 | 0.5 | 61 |

TABLE II-continued

| | Barium Sulfate Inhibition pH 5.0, room temperature (22-25° C.) | | | |
|---|---|---|---|---|
| Example | Orlene BA (ppm product) | AA/AMPSA (ppm active) | $Al_{+3}$ (ppm) | % inhibition 24 hrs. |
| 14 | 10 | 15 | 0.5 | 99 |
| 15 | 0 | 15 | 0.5 | 14 |

What is claimed is:

1. A method for inhibiting barium sulfate scale deposition in a recirculating water system containing aluminum ions and having a pH of about 4.5 to about 10.0 comprising adding to said system an effective amount of a composition comprising tripolyphosphate, sodium hexametaphosphate, polyacrylic acid, sodium glucoheptanate to inhibit said barium sulfate scale deposition and a water soluble polymer having an intrinsic viscosity of 0.05 to 0.5 dl/g in 1.0 M NaCl, prepared from:

(A) 50 to 70%, by weight, of an unsaturated carboxylic compound selected from the group consisting of acrylic acid, methacrylic acid, their salts and mixtures thereof; and (B) 30 to 50%, by weight, of an unsaturated sulfonic compound selected from the group consisting of 2-acrylamido-2-methylpropyl sulfonic acid, 2-methacrylamido-2-methylpropyl sulfonic acid, their salts and mixtures thereof in an amount effective for solubilizing said aluminum ions and allowing said composition to effectively inhibit said barium sulfate scale deposition.

2. The method of claim 1, wherein said system is at a pH of about 5.0.

* * * * *